United States Patent
Shih et al.

(10) Patent No.: US 7,269,469 B2
(45) Date of Patent: Sep. 11, 2007

(54) SYSTEM AND METHOD FOR SCHEDULING MANUFACTURING JOBS FOR A SEMICONDUCTOR MANUFACTURING TOOL

(75) Inventors: Jui-An Shih, Kaohsiung (TW); Ko-Pin Chang, Tainan (TW); Hui-Tang Liu, Yong Kang (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 281 days.

(21) Appl. No.: 10/796,646

(22) Filed: Mar. 9, 2004

(65) Prior Publication Data
US 2005/0203654 A1    Sep. 15, 2005

(51) Int. Cl.
*G06F 19/00* (2006.01)
(52) U.S. Cl. ........................ 700/100; 700/108
(58) Field of Classification Search ................ 700/100, 700/101–103, 97, 99, 108–110
See application file for complete search history.

(56) References Cited

U.S. PATENT DOCUMENTS 5,582,746 A    12/1996  Barbee et al.
6,618,639 B2*  9/2003  Nakashima .................. 700/109
6,865,434 B1*  3/2005  Lin et al. ..................... 700/108
7,089,077 B1*  8/2006  Reitmeyer et al. .......... 700/121
2002/0107599 A1*  8/2002  Patel et al. ..................... 700/99
2003/0009256 A1*  1/2003  Marume et al. ............ 700/121
2003/0120371 A1*  6/2003  Joma et al. ................. 700/100
2003/0125832 A1*  7/2003  Nakashima ................. 700/213
2004/0039469 A1*  2/2004  Lin ............................ 700/100
2004/0193300 A1*  9/2004  Rice et al. .................. 700/101

* cited by examiner

*Primary Examiner*—Zoila Cabrera
(74) *Attorney, Agent, or Firm*—Haynes and Boone, LLP

(57) ABSTRACT

A system and method are provided for scheduling a monitor job for a tool in a semiconductor manufacturing environment and for optimizing the scheduling of jobs in such an environment. In one example, the method includes receiving a monitor job and monitoring a status of the tool to determine when a predefined event occurs. A position in a buffer in which to place the monitor job may be identified in response to the event occurring, where placing the monitor job in the identified position will cause the monitor job to be executed at a correct time.

22 Claims, 12 Drawing Sheets

|  | Tank1 | Tank2 | Tank3 |
|---|---|---|---|
| Life Count | 1 | 0 | 1 |
| History Life Count | 1 | 0 | 0 |
| Batch Level Life Count (LC-HLC) | 0 | 0 | 1 |
| Processing Batch Life Count | 1 | 1 | 1 |
| Waiting Batch Life Count | 1 | 1 | 1 |
| New Batch Life Count | 0 | 0 | 0 |
| BLLC+PBLC+WBLC+NBLC | 2 | 2 | 3 |
| Change Chemical Life Count | 3 | 3 | 3 |

FIG. 4c

|  | Tank1 | Tank2 | Tank3 |
|---|---|---|---|
| Life Count | 2 | 1 | 1 |
| History Life Count | 2 | 1 | 0 |
| Batch Level Life Count (LC-HLC) | 0 | 0 | 1 |
| Processing Batch Life Count | 2 | 2 | 2 |
| Waiting Batch Life Count | 0 | 0 | 0 |
| New Batch Life Count | 0 | 0 | 0 |
| BLLC+PBLC+WBLC+NBLC | 2 | 2 | 3 |
| Change Chemical Life Count | 3 | 3 | 3 |

FIG. 4d

SYSTEM AND METHOD FOR SCHEDULING MANUFACTURING JOBS FOR A SEMICONDUCTOR MANUFACTURING TOOL

BACKGROUND

The present disclosure relates generally to a system and method for use in a semiconductor manufacturing environment and, more particularly, to a system and method for scheduling production equipment jobs in such a manufacturing environment.

The mass production of semiconductor devices utilizes different equipment for different processes. Semiconductor devices are often created by processing batches of product wafers, with each product wafer in a batch being processed with the other wafers. In other processes, a wafer may be processed by itself or with only a portion of a batch.

The production equipment and processes used for manufacturing a particular semiconductor device may vary depending on the device and/or device characteristics desired. For example, one semiconductor device may undergo a processing step using one type of fluid, while another device may be processed in a similar manner but with a different type of fluid. Each device may undergo a series of processes performed by different equipment.

The amount of equipment, along with the different functionality and possible combinations of chemicals and processes used with the equipment, increases the complexity of monitoring and maintaining the equipment. For example, a manufacturing environment may rely heavily on monitor wafers to test the current capability of a process and help to determine if there may be a problem with the process or the equipment. However, the scheduling of monitor wafers between product wafers may interrupt the general flow of product wafers into a process. In addition, the scheduling of any maintenance action associated with a piece of manufacturing equipment may interrupt the manufacturing process, resulting in wasted time, wasted resources, etc. Another issue is the lack of flexibility in scheduling the processing of product wafers.

Accordingly, what is needed in the art is a system and method that addresses the above discussed issues.

BRIEF DESCRIPTION OF THE DRAWINGS

FIGS. 4a-4h illustrate an example in which the manufacturing tool of FIG. 1 is a wet bench used to process multiple batches of wafers based on the method of FIG. 3.

DETAILED DESCRIPTION

Figure 1:
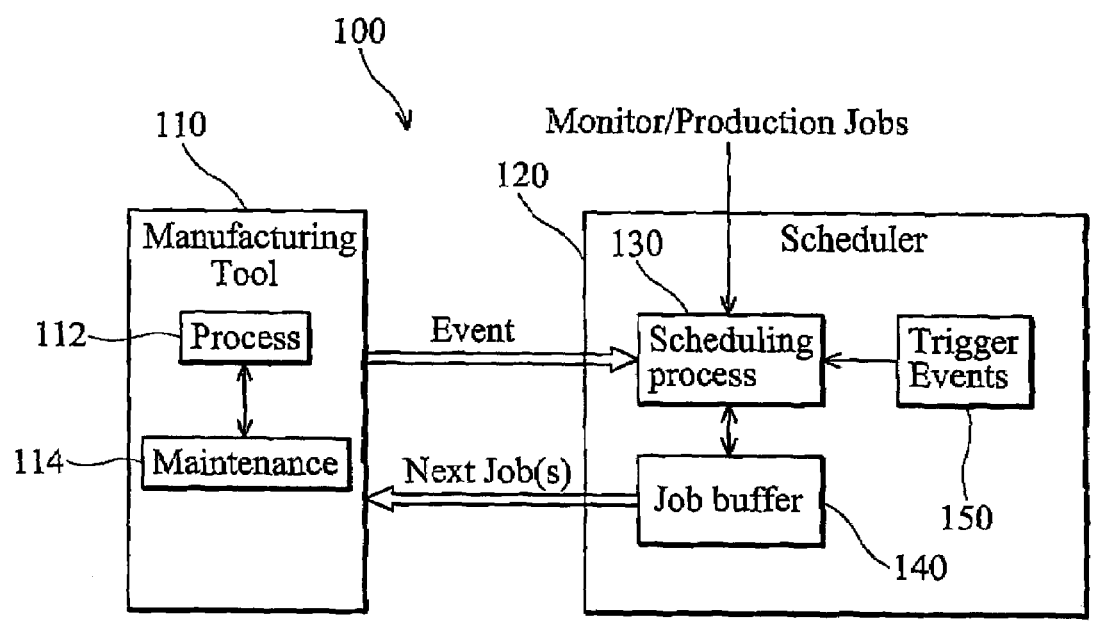
FIG. 1 illustrates an exemplary system in which jobs for a manufacturing tool may be scheduled.

The present disclosure relates generally to a system and method for use in a semiconductor manufacturing environment and, more particularly, a system and method for scheduling production equipment jobs in such a manufacturing environment. It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, an exemplary system 100 illustrates one environment that may be used to schedule events for a manufacturing tool 110. In the present example, the system 100 includes the manufacturing tool 110 and a scheduler 120. It is understood that the system 100 may include other components, such as a manufacturing execution system (MES) (not shown). Furthermore, although the scheduler 120 is illustrated in the present embodiment as a stand-alone component, it is understood that the scheduler 120 may be integrated with another component, such as the manufacturing tool 110 or the MES. In some examples, the scheduler 120 may communicate with the MES regarding status changes of the manufacturing tool 110 and/or may inform the MES of an event occurrence, and the MES may then communicate with the manufacturing tool 110.

Although not shown, an exemplary MES may be an integrated computer system representing methods and tools used to accomplish production. For example, the functions of the MES may include collecting data in real time, organizing and storing the data in a centralized database, work order management, workstation management, process management, inventory tracking, and document control. The MES may be connected to other systems both within the system 100 and outside of the system 100. Examples of a MES include SiView, Promis, Workstream, Poseidon, and Mirl-MES. Each MES may have a different application area. For example, Mirl-MES may be used in applications involving packaging, liquid crystal displays (LCDs), and printed circuit boards (PCBs), while SiView, Promis, Workstream, and Poseidon may be used for IC fabrication and thin film transistor LCD (TFT-LCD) applications. A MES may include such information as a process step sequence for each product.

The manufacturing tool 110 may be a single or multiple process tool, such as a cluster tool, and may provide for one or more semiconductor manufacturing processes. For example, the manufacturing tool 110 may provide for etching, photolithography, diffusion, and/or thin film deposition. The manufacturing tool 110 may include a chemical bench or bath (e.g., a wet bench), a dry process tool, a vacuum chamber, a spin coater, a metrology tool, and/or other tools. The manufacturing tool 110 may provide for the movement of batches of substrates that may include product or monitor semiconductor wafers. The batch may be encased in a container that may be purged with a dry inert gas such as $N_2$, Ar, He, or any other appropriate gas. The manufacturing tool 110 may further provide for the transport and processing of single substrates.

In the present example, the manufacturing tool 110 includes a process state 112 and a maintenance state 114. The process state 112 represents a manufacturing status (e.g., currently processing a batch) of the manufacturing tool 110. The maintenance state 114 represents a testing and/or maintenance state. The testing may include process and/or equipment tests utilizing monitor substrates and/or product substrates. For example, the maintenance state 114 may provide for the detection of particle problems through the insertion of a monitor wafer into the manufacturing tool 110. The monitor wafer may undergo processing, or may enter the manufacturing tool 110 without processing, during which particles may accumulate upon the monitor wafer. The accumulation of particles may provide an indication of the source of particles, and the severity of particle contamination in the manufacturing equipment 110. If the manufacturing tool 110 includes a chemical process, monitor wafer (s) and/or product wafer(s) may be processed in a batch or by single wafer. Monitor wafer(s) may be used to ascertain the amount of contamination at periodic intervals, enabling scheduled maintenance of a chemical bath to be performed when needed.

The maintenance state may include the replenishment of the chemical bath with uncontaminated chemicals, as well as gas cylinder exchanges, equipment component exchanges, tool cleaning, and/or other maintenance procedures that may interrupt the manufacturing operations of the manufacturing tool 110. For example, chemical vapor deposition (CVD) or atomic layer process (ALD) periodic maintenance may include insitu vapor, gas, or plasma cleaning, as well as manual wet cleaning of the manufacturing tool 110. The insitu cleaning may comprise the utilization of perfluorocarbons and/or fluorine or chlorine containing fluids.

The scheduler 120 includes a scheduling process 130, a job buffer 140, and one or more triggering events 150. As will be described in greater detail below, the scheduling process 130 receives one or more production jobs and/or monitor jobs. The scheduling process 130 then monitors a status of the manufacturing tool 110, waiting for the occurrence of a predefined event that matches one of the trigger events 150. While the scheduling process 130 is waiting for an event to occur, additional jobs may be placed into job buffer 140. Some of these jobs may be rearranged by the scheduling process 130 to ensure that the manufacturing tool 110 processes the jobs in an efficient manner. When a triggering event occurs, the scheduling process 130 determines when the monitoring job should occur and may adjust the job order in the job buffer 140 accordingly. It is noted that the term "job" in the present disclosure may include a batch, a lot, or a single wafer, and may represent one or more materials, wafers, devices, or groups of such items that may be processed during semiconductor manufacturing.

In the present example, the manufacturing tool 110 comprises wet bench equipment that includes one or more tanks (e.g., baths). Each tank may contain a different chemical or solution, or some or all tanks may include the same chemical or solution. Batches of wafers may be processed through one or more of the tanks, depending on a particular recipe associated with each batch. The number of batches that is processed through a tank may be referred to as the tank's "run count." For purposes of illustration, there are two types of monitor tasks associated with the manufacturing tool 110: a particle monitor task and a change chemical monitor task. The particle monitor task is used to determine whether one or more of the tanks are contaminated with particles. For the particle monitor, the run count of the bath is monitored and a monitor job may be placed in the job buffer 140 with the correct timing and order. For the change chemical monitor task, the monitor is used to adjust the order of jobs in the job buffer 140 after an event indicating that the chemical change is complete is received. This may also be used to alter the order of jobs in the job buffer 140 to increase the efficiency of the manufacturing tool 110.

It is understood that the flow of data illustrated between the scheduler 120 and the manufacturing tool 110 is only an example of an actual data flow and that other information may be exchanged between the scheduler 120 and the manufacturing tool 110, and the exchanges may occur in both directions. Furthermore, the components within the scheduler 120 and/or manufacturing tool 110 that receive and/or send data may vary. For instance, while the scheduling process 130 is illustrated as receiving an event and the job buffer 140 is illustrated as sending a job, these illustrations are for purposes of example only.

Figure 2:
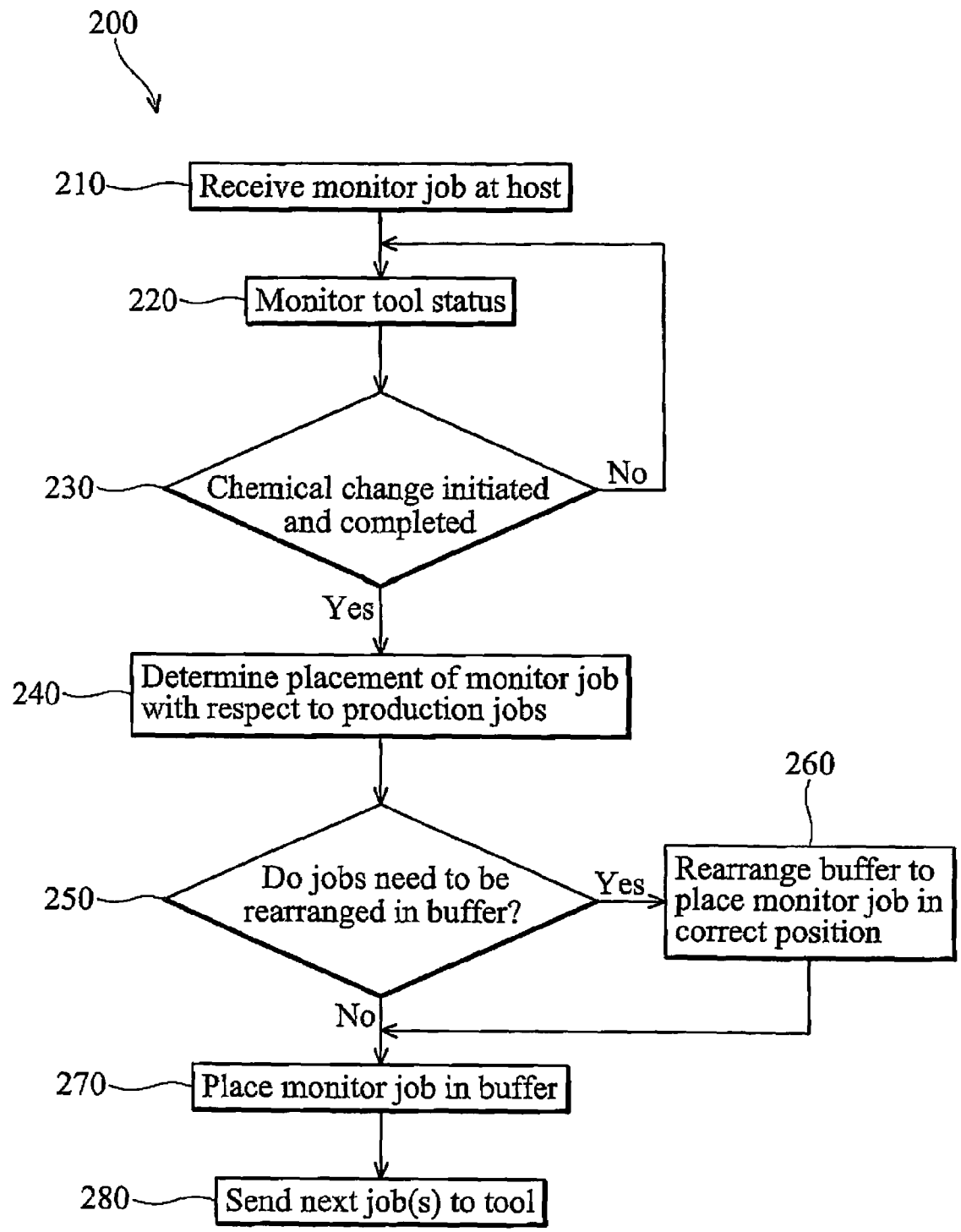
FIG. 2 illustrates a flow chart of one embodiment of a method for scheduling monitor jobs that may be executed within the environment of FIG. 1.

Referring now to FIG. 2, an exemplary method 200 illustrates the receipt and execution of a monitor job within the system 100 of FIG. 1. In step 210, a monitor job is received by the scheduling process 130. The monitor job may be to process a monitor wafer or wafers through the manufacturing tool 110 to determine a level of particle contamination. In step 220, the status of the manufacturing tool 110 is monitored. This monitoring step may, for example, determine whether the manufacturing tool 110 is in the process state 112 or the maintenance state 114. Alternatively, step 220 may simply involve waiting to be notified that an event has occurred that matches a trigger event 150 (e.g., an MES status change indicating a chemical change may be used to trigger the timing of the monitor job). In the present example, the trigger event is a chemical change in at least one of the tanks associated with the manufacturing tool 110. In step 230, a determination may be made as to whether the chemical change is complete. If not, the method 200 repeats steps 220 and 230 until the chemical change is completed. Alternatively, the method 200 may wait for an event to occur indicating that the chemical change is complete.

In step 240, the scheduling process determines where to place the monitor job in the job buffer 140. The placement may depend on such factors as the average amount of time per job, the number of jobs that should be processed before processing the monitor job, etc. In step 250, a determination is made as to whether jobs in the job buffer 140 need to be rearranged to permit proper placement of the monitor job. If jobs do need to be rearranged, then the method 200 moves to step 260 where the jobs are rearranged, and the monitor job is placed in the correct position in step 270. If the jobs do not need to be rearranged (e.g., if the monitor job can be placed in the queue behind the production jobs), then the method 200 continues to step 270 and places the monitor job in the buffer. In step 280, the next job or jobs are sent from the job buffer 140 to the tool. It is understood that jobs may be placed in the job buffer 140 at any time during the execution of the method 200.

Figure 3:
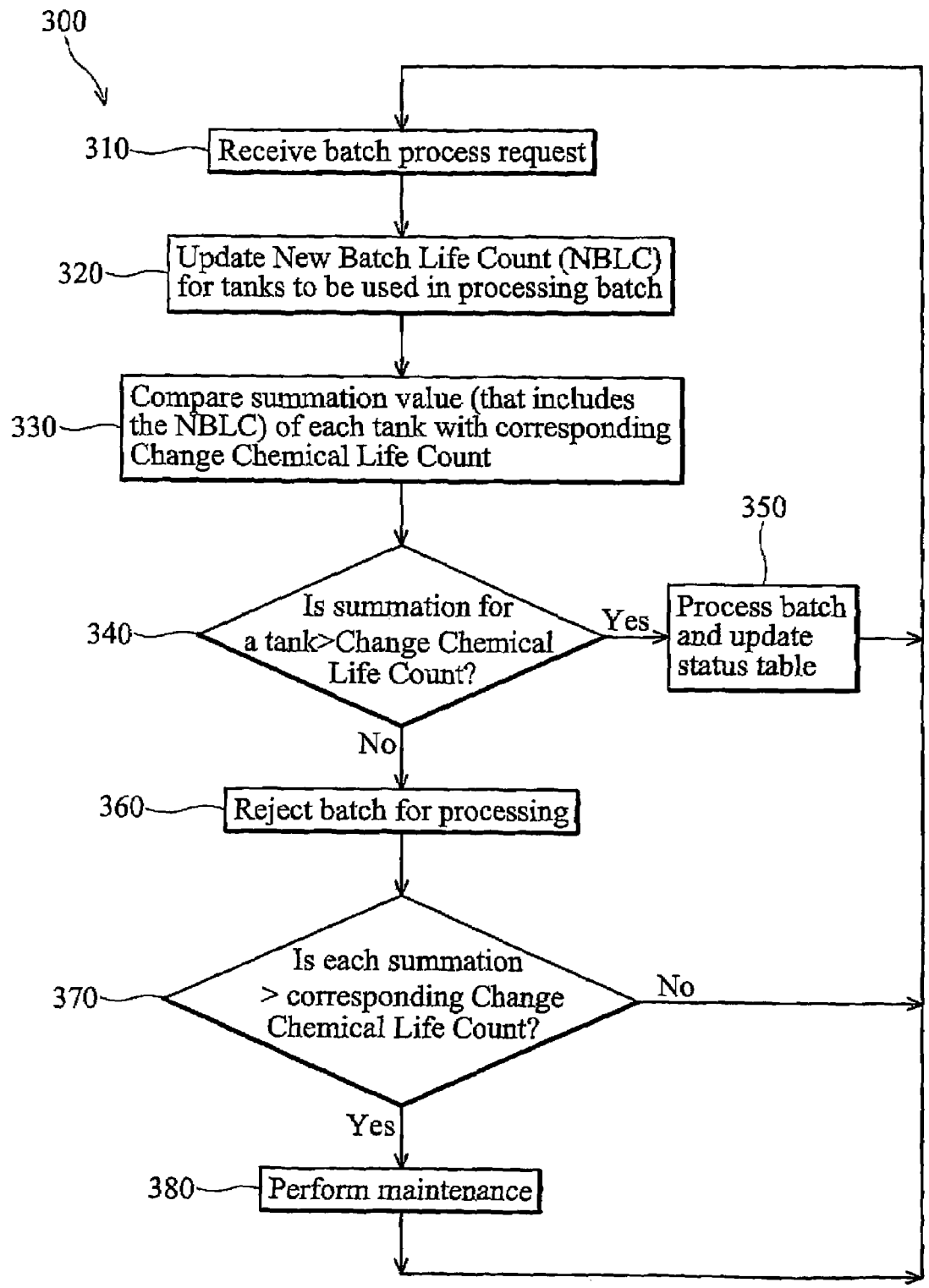
FIG. 3 illustrates a flow chart of another embodiment of a method for scheduling jobs that may be executed within the environment of FIG. 1.

Referring now to FIG. 3 and with additional reference to FIGS. 4a-4h, in another embodiment, a method 300 may be used to determine whether to accept or reject a new batch for processing by the manufacturing tool 110 of FIG. 1. Furthermore, the method 300 may schedule maintenance for the manufacturing tool 110. The maintenance event in the present embodiment is to change a chemical in one of the tanks when a predefined event occurs. This predefined event is based on a maximum number of batches that may be processed in a given tank before the chemical(s) in the tank become contaminated.

As will be described below with a specific example in FIGS. 4a-4h, the scheduling process 130 of FIG. 1 may use the method 300 to rearrange jobs in the job buffer 140 and to schedule maintenance of the manufacturing tool 110 in order to optimize the processing of jobs by the manufacturing tool 110. In the present example, the manufacturing tool 110 is a wet bench that includes three tanks denoted Tank1, Tank2, Tank3. A batch of wafers (e.g., a job) may be processed through one or more of the tanks, depending on a recipe associated with the batch. Accordingly, different batches (in the present example, Batch1, Batch2, Batch3, and Batch4) may have different or similar processing requirements, and the method 300 may attempt to coordinate these requirements for efficient use of the manufacturing tool 110.

In step 310, a request to process a batch is received and, in step 320, a New Batch Life Count (described in greater detail below with respect to FIGS. 4a-4h) is updated to reflect the new batch. In step 330, a summation value (described in greater detail below with respect to FIGS. 4a-4h) that includes the updated New Batch Life Count is compared to a Change Chemical Life Count value that, in the current example, represents the number of batches that can be processed through a particular tank before the chemical is to be changed. If the summation value is not greater than the Change Chemical Life Count, then the method 300 continues to step 350, where the batch is processed and the status table is updated. However, if the summation value is greater than the Change Chemical Life Count, then the method 300 continues to step 360, where the batch is rejected for processing.

However, to avoid removing the manufacturing tool 110 from processing unnecessarily, the method 300 determines in step 370 whether the summation value is greater than the Change Chemical Life Count of each tank Tank1, Tank2, Tank3. If the summation value is not greater than the Change Chemical Life Count, then it may be possible to process another batch using the tanks where the summation value is not greater than the Change Chemical Life Count. The method 300 may then return to step 310 and receive another batch process request. However, if the summation value is greater than the Change Chemical Life Count of each tank, then maintenance should be performed in step 380. At this point, the manufacturing tool 110 may be placed "offline" in order for the chemicals in each tank to be changed.

It is noted that, in some examples, the chemicals may be changed even if the summation value is not greater than the Change Chemical Life Count of each tank. For example, if only one tank remains available for processing and no batches remain for processing using only that tank, then the chemicals in some or all of the tanks may be changed. It is understood that the Change Chemical Life Count is merely one example of a threshold value that may be used to determine whether a batch should be processed. Furthermore, the use of relationships such as "greater than" and "less than" are understood to be for purposes of illustration, and other relationships may be used in place of, or in addition to, those described.

Figure 4A:
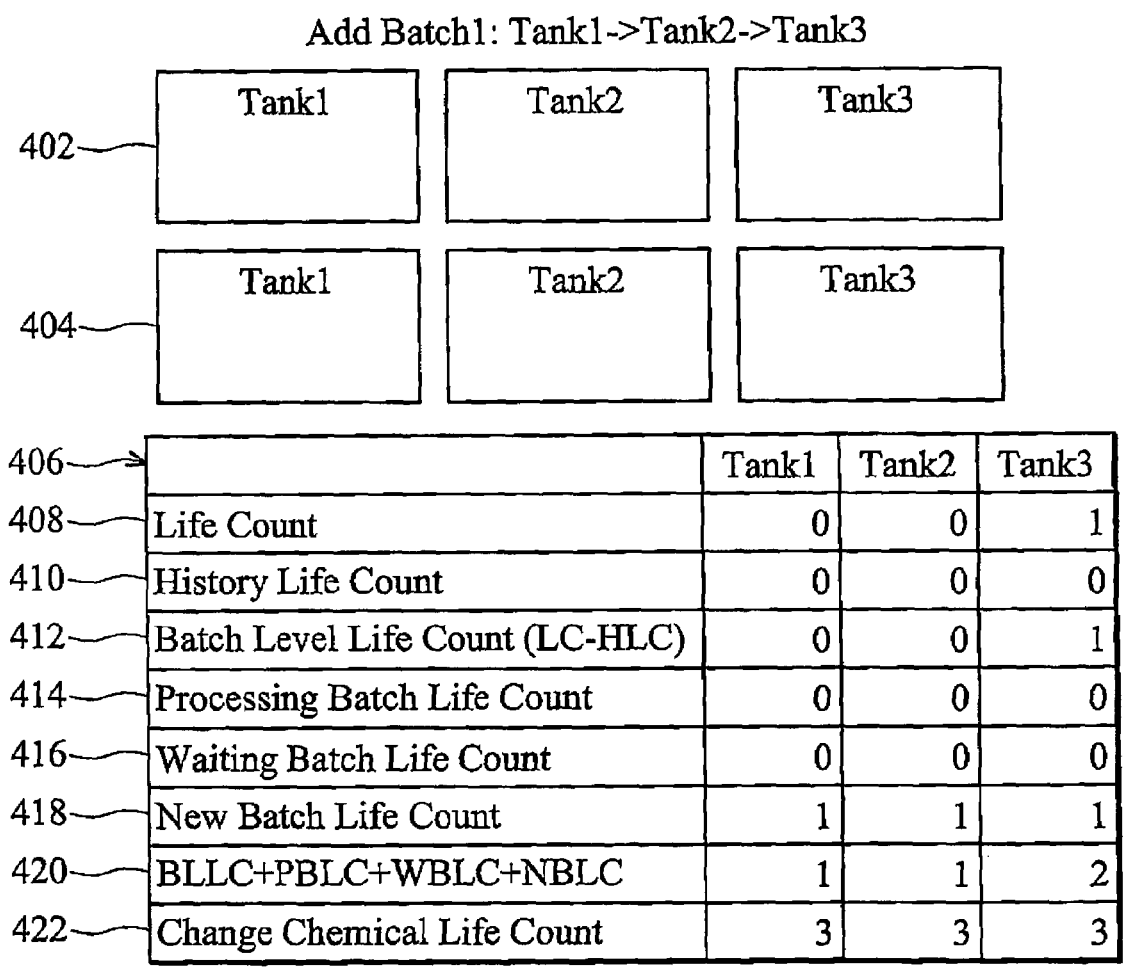

Referring now to FIGS. 4a-4h and with specific reference to FIG. 4a, the three tanks Tank1, Tank2, and Tank3 are illustrated with a current tank status 402 and a tank history 404. The current tank status 402 represents whether the particular tank is currently empty or contains a batch, and the tank history 404 represents batches that have already been processed in the tank but for which the whole job has not been completed. FIG. 4a also includes a table 406 that associates various counts with each tank. For example, each tank is associated with a Life Count 408, a History Life Count 410, a Batch Level Life Count (BLLC) 412, a Processing Batch Life Count (PBLC) 414, a Waiting Batch Life Count (WBLC) 416, a New Batch Life Count (NBLC) 418, a summation 420, and a Change Chemical Life Count 422. It is understood that these designations are for purposes of example only, and that other designations may be used. For example, the NBLC may be referred to as a "new job count."

The Life Count 408 for a tank is updated each time a batch enters that tank. The History Life count 410 for a tank is updated each time a batch that is currently being processed in the wet bench (e.g., any of the three tanks) has been processed through a tank. When the batch is finished processing through the wet bench, the History Life Count 410 is reduced by one. The BLLC 412 is equal to the History Life Count 410 subtracted from the Life Count 408, and represents the number of batches that have passed through a tank and that have completed their processing (through all tanks). The PBLC 414 for a tank is updated when a new batch is received and represents whether the batch will go through the tank or not. The WBLC 416 is updated when a batch is waiting for processing in a given tank (or tanks), but has not yet began to be processed. The NBLC 418 is updated when a request to process a batch has been received, but the request has not yet been accepted. The summation 420 represents the sum of the BLLC 412, PBLC 414, WBLC 416, and NBLC 418 for each tank. The Change Chemical Life Count 422 represents the number of batches that can be processed through a particular tank before the chemical is to be changed. In the present example, if the summation 420 is greater than the Change Chemical Life Count 422 for a particular tank, then the chemical(s) in that tank need to be changed before another batch is processed using that tank.

In the present embodiment, Batch1, Batch2, Batch3, and Batch4 are to be processed through the tanks as follows.

Batch1=Tank1→Tank2→Tank3
Batch2=Tank1→Tank2→Tank3
Batch3=Tank1→Tank3
Batch4=Tank1→Tank2

This processing order may be based, for example, on a particular recipe to be used for each batch, as well as the chemicals associated with each tank.

In FIG. 4a, Tank1 and Tank2 contain fresh (e.g., non-contaminated) chemicals. However, Tank3 does not contain fresh chemicals, as indicated by the Life Count 408 associated with Tank3 having a value of 1 (e.g., one batch has already been processed through Tank3). Further, each tank may process a total of three batches before the chemical(s) within the tank need to be changed, as indicated by the value of 3 assigned to the Change Chemical Life Count 422 associated with each tank.

Batch1 is added to the wet bench in FIG. 4a, resulting in a value of 1 (e.g., one batch) being assigned to the NBLC 418 associated with each of the tanks to be used in processing Batch1. As illustrated previously, Batch1 is to be processed using all three tanks Tank1, Tank2, and Tank3, and so the NBLC 418 of each tank is updated. The summation 420 is now at 1, 1, 2, for Tank1, Tank2, and Tank3, respectively. As this is less that the Change Chemical Life Count 422 of 3 for each tank, Batch1 may be processed.

Figure 4B:
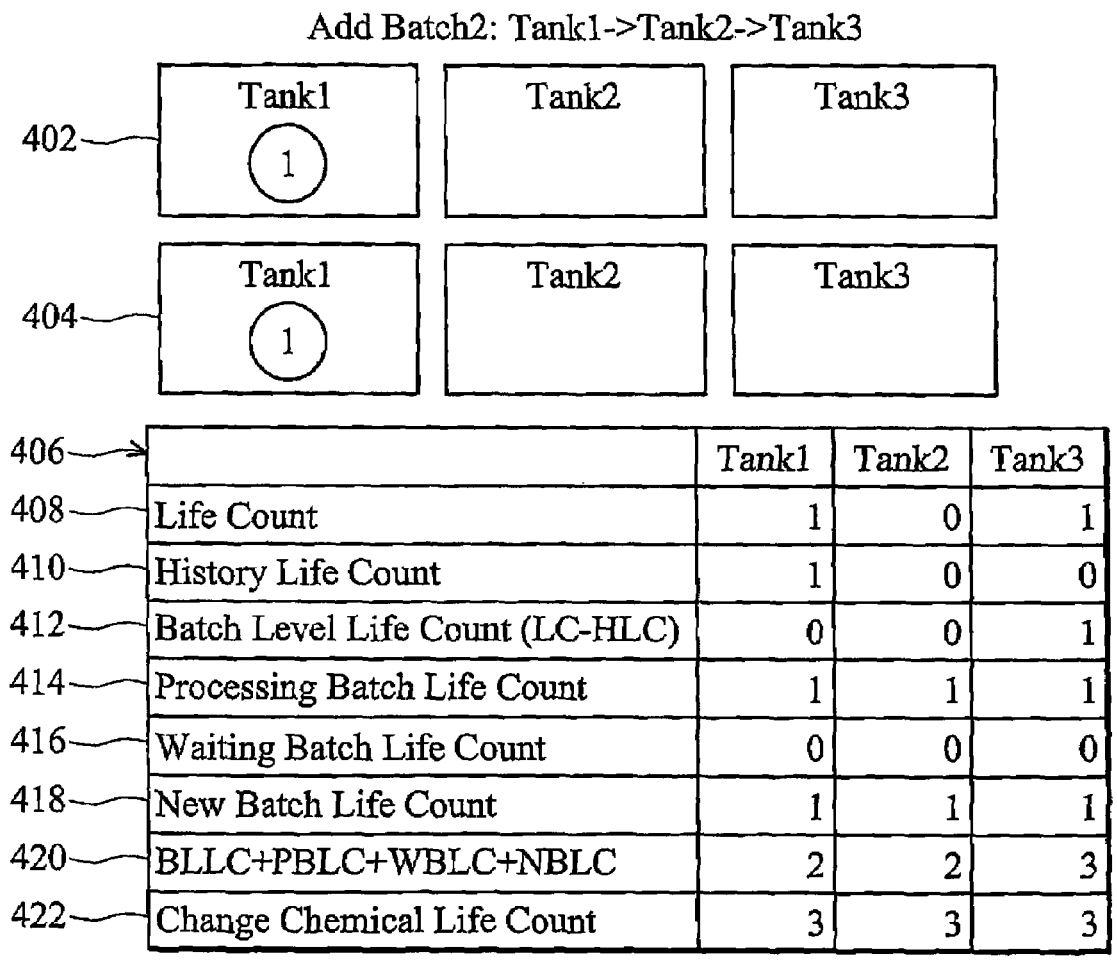

With additional reference to FIG. 4b, Batch1 has entered Tank1, and so the Life Count 408 and History Life Count 410 for Tank1 are both updated to 1. As Batch1 has been accepted for processing through each tank, the PBLC 414 is also updated to 1 for each tank. It is noted that the BLLC 412 is currently 0 for Tank1, as Batch1 has not yet completed its processing through all three tanks. At this time, as the summation 420 for each tank is not greater than the Change Chemical Life Count 422, Batch2 may be received. This causes similar updates as those described with respect to Batch1 in FIG. 4a (e.g., the NBLC 418 is updated to reflect Batch2).

With additional reference to FIG. 4c, Batch1 is shown as undergoing processing while Batch2 is waiting. Accordingly, the NBLC 418 is updated to 0, and the WBLC 416 is updated to 1 for each tank to reflect the waiting status of Batch2.

With additional reference to FIG. 4d, Batch1 has finished processing in Tank1 and has moved to Tank2. Batch2 has began processing in Tank1. These movements cause corresponding updates in the table 406. For example, the Life Count 408 associated with Tank1 is updated to 2, as two batches have now entered Tank1 since the last chemical change. Furthermore, as Batch1 has not yet finished its processing cycle through all three tanks, the History Life Count 410 associated with Tank1 is 2, and the BLLC 412 is still 0. It is noted that the summation 420 has not changed from FIG. 4c.

Figure 4E:
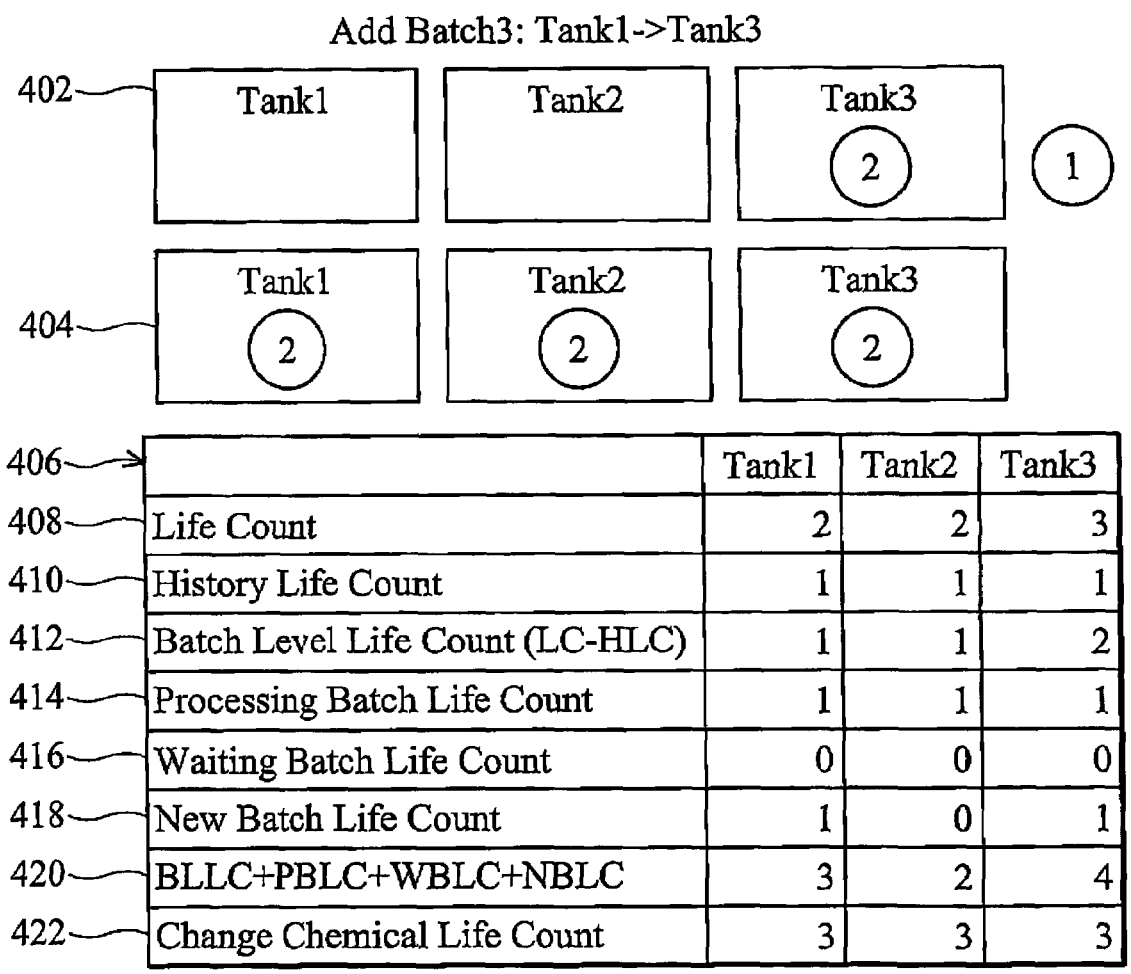

With additional reference to FIG. 4e, Batch1 moves to Tank3 and Batch2 moves to Tank2. Corresponding updates are made in table 406.

Figure 4F:
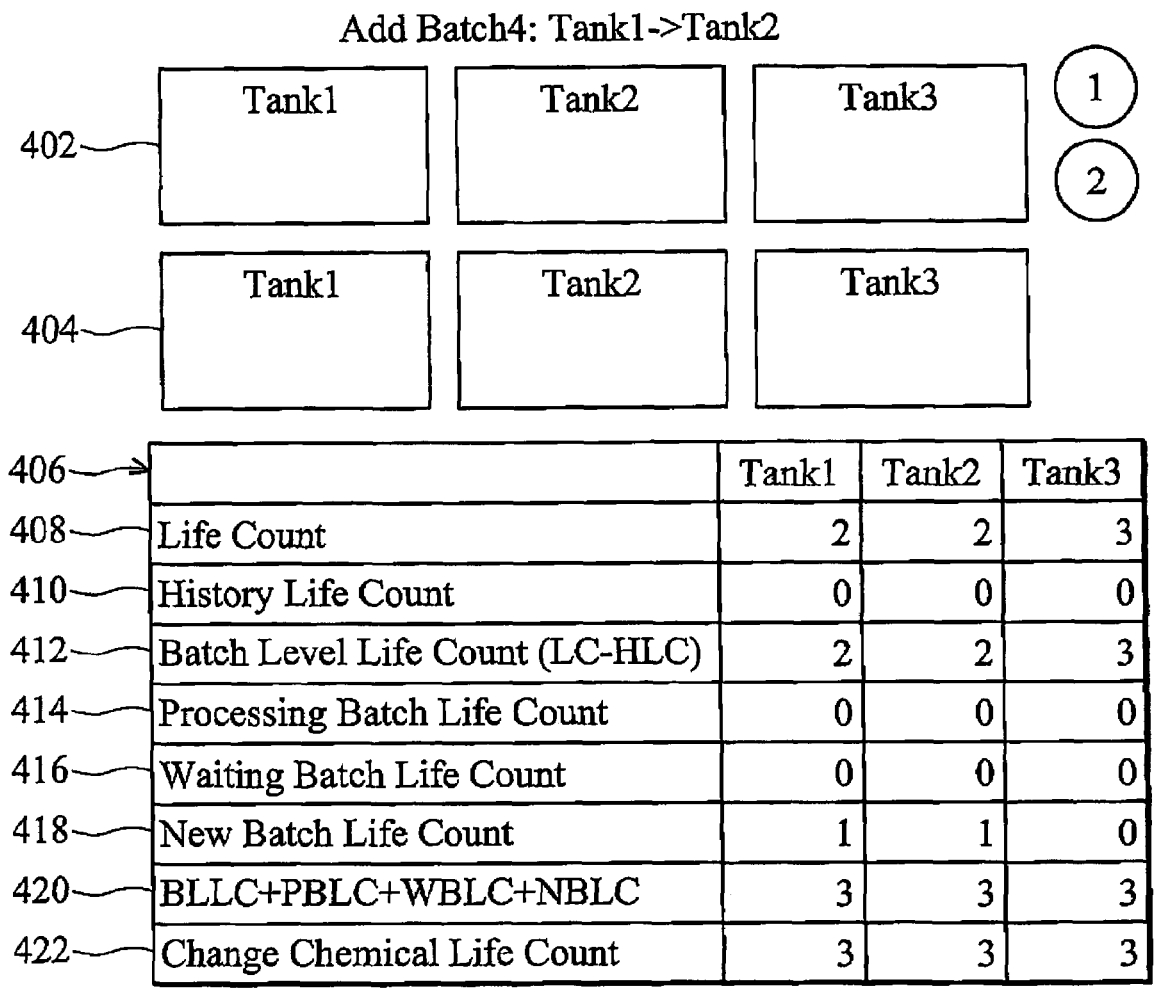

With additional reference to FIG. 4f, Batch1 has finished processing and moves out of the wet bench, while Batch2 moves to Tank3. Because Batch1 is now complete, the value of the History Life Count 410 is updated to 1. This results in a change in the BLLC 412 of each tank to 1, 1, and 2, respectively.

Figure 4G:
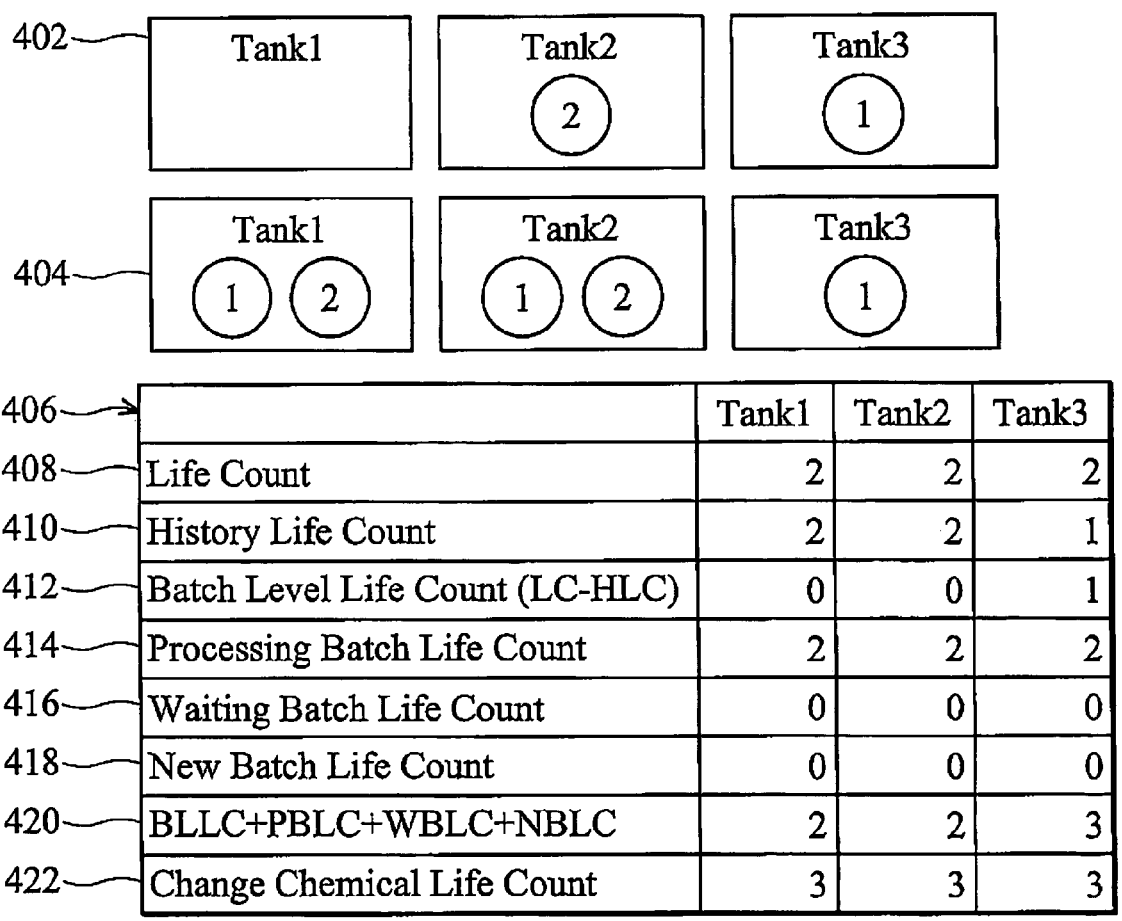

With additional reference to FIG. 4g, Batch3 is added. However, Batch3 is only to be processed using Tank1 and Tank3, and so only the NBLC 418 for Tank1 and Tank3 is updated. However, this results in a summation 420 value for Tank3 that is greater than the Change Chemical Life Count 422 of Tank3. Accordingly, Batch3 is rejected and not accepted for processing. It is understood that Batch3 may be requeued to await processing following a chemical change, it may be redirected for processing to another wet bench, or it may be handled in other ways. Because Batch3 is rejected, table 406 returns to the same state as illustrated in FIG. 4f.

Figure 4H:
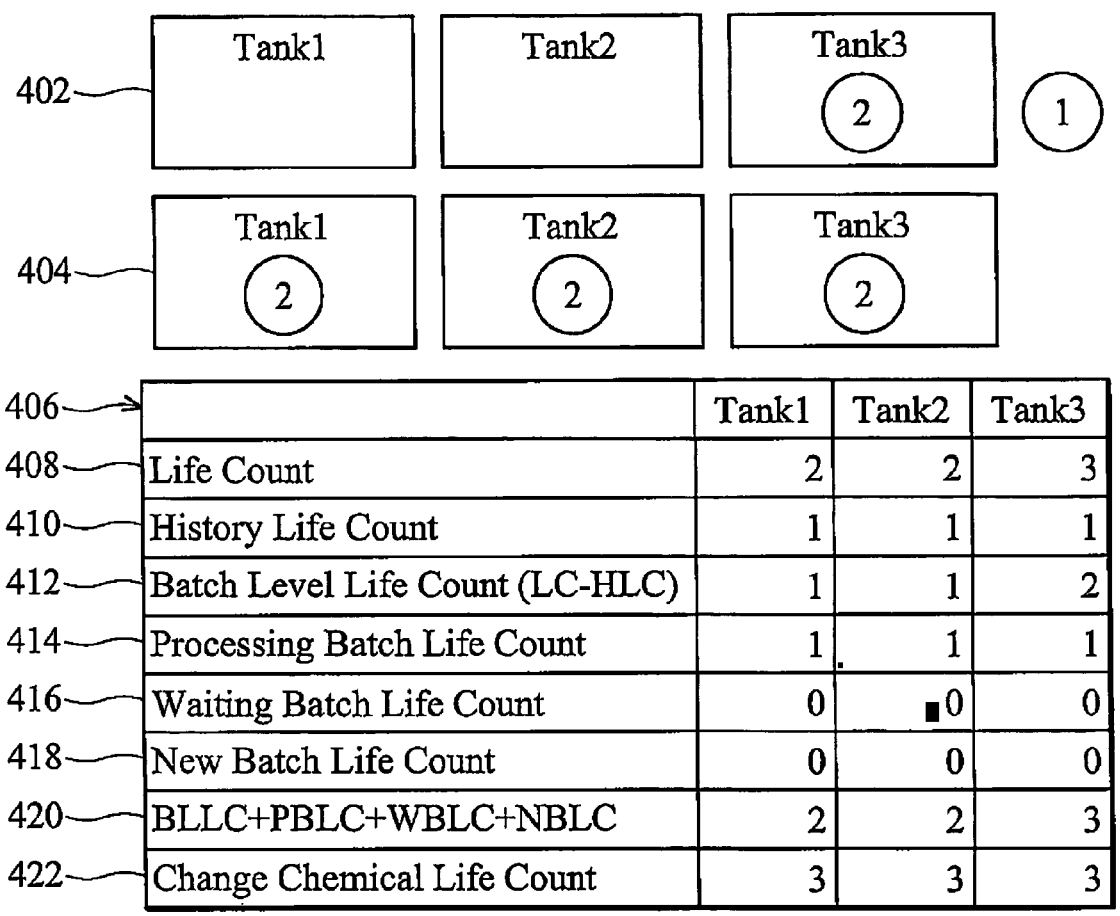

With additional reference to FIG. 4h, Batch4 is added. However, Batch4 is only to be processed using Tank1 and Tank2, and so only the NBLC 418 for Tank1 and Tank2 is updated. This results in a summation 420 value for both Tank1 and Tank2 that is equal to (but not greater than) the Change Chemical Life Count 422 of each tank. As Batch4 is not to be processed using Tank3 (which would result in its rejection for the same reason that Batch3 was rejected), Batch4 is not rejected. Accordingly, Batch4 may be processed using Tank1 and Tank2 as previously described, with the table 406 being updated in a corresponding manner.

As can be seen by the table 406 of FIG. 4h, the chemical (s) within all three tanks Tank1, Tank2, and Tank3 need to be changed before any of the tanks can be used for further processing (e.g., the summation 420 of each tank will be greater than the Change Chemical Life Count 422 if another batch is accepted). As a result of the scheduling used to reject Batch3 and accept Batch4, all three tanks can be changed at one time without wasting chemicals that do not yet need to be changed, and without removing the wet bench from operation for a longer time than is needed. Once the chemicals are changed and the table 406 is reset, Batch3 or another batch may be processed as previously described with changes occurring to the table 406 during the processing.

It is noted that, at this point, a signal may be sent to the scheduler 120 of FIG. 1 indicating that the chemical change has occurred (e.g., in step 230 of FIG. 2). The scheduler 120 may then insert a monitor job into the job buffer 140 as described with respect to FIG. 2. Accordingly, the method 200 of FIG. 2 and the method 300 of FIG. 3 may be combined or executed in parallel, simultaneously, or sequentially to both place monitor jobs and to optimize the processing achieved by the manufacturing tool 100.

Figure 5:
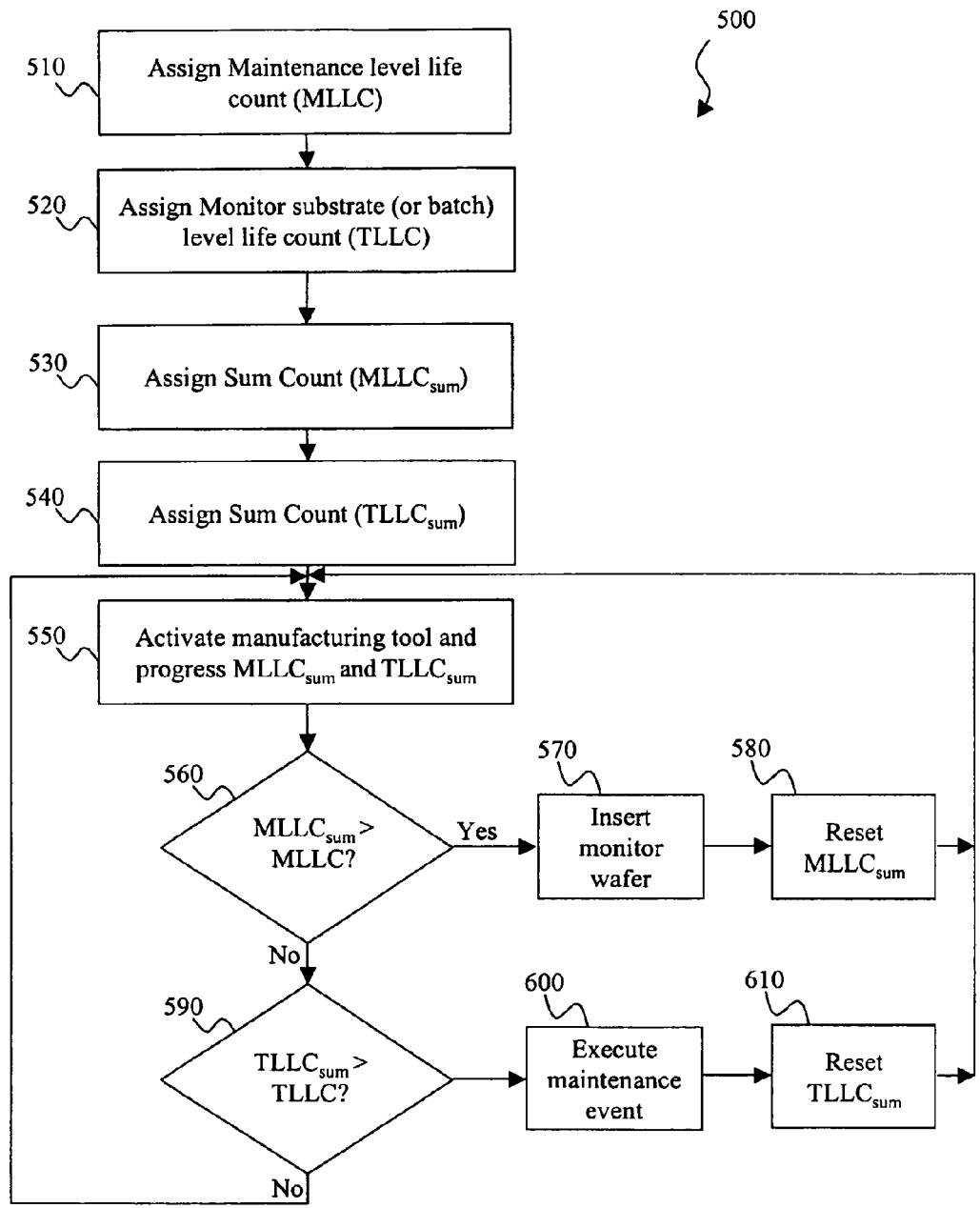
FIG. 5 illustrates a flow chart of yet another embodiment of a method for scheduling jobs that may be executed within the environment of FIG. 1.

Referring now to FIG. 5, in yet another embodiment, an exemplary method 500 may be executed within the system 100 of FIG. 1 to provide for the scheduling of testing and/or maintenance of the manufacturing tool 10. The method 500 may begin with step 510 by assigning a maintenance level life count (MLLC) to the manufacturing tool 110. The MLLC may be partitioned into a plurality of variables related to the number of processed wafers (or batches), the number of wafers (or batches) in process, and the number of wafers (or batches) waiting to be processed. Following or in parallel to step 510, a monitor wafer (or batch) level life count (TLLC) may be assigned to the manufacturing tool 10 in step 520. The TLLC may be partitioned into a plurality of variables related to the number of processed wafers (or batches), the number of wafers (or batches) in process, and the number of wafers (or batches) waiting to be processed by the manufacturing tool 110.

In step 530, a first summation variable may be assigned. The summation variable, denoted the maintenance level life count summation ($MLLC_{sum}$), may include a sum of variables including a batch (or wafer) maintenance life count, a batch (or wafer) maintenance processing life count, a waiting batch (or wafer) maintenance life count, and a new batch (or wafer) maintenance life count. The batch (or wafer) maintenance life count may be a variable representing the number of batches (or wafers) that may have gone through the specified manufacturing tool 110. The waiting batch (or wafer) maintenance may be a variable representing the number of batches (or wafers) waiting to be processed by the specified manufacturing tool 110. The waiting to be processed batches (or wafers) may be a list of specified batches (or wafers). The new batch (or wafer) maintenance life count may represent batches for which requests for processing have been received, but that have not yet been accepted for processing. The $MLLC_{sum}$ may be compared to the MLLC of the manufacturing tool 110. If the $MLLC_{sum}$ is greater than the MLLC specified for the manufacturing tool 110, then the next batch or product wafer may be rejected and the manufacturing tool 110 may be put into a state of maintenance.

In step 540, a second summation variable may be assigned. The summation variable, denoted the monitor level life count summation ($TLLC_{sum}$), may include a sum of variables including a batch (or wafer) monitor life count, a batch (or wafer) monitor processing life count, a waiting batch (or wafer) monitor life count, and a new batch (or wafer) monitor life count. The batch (or wafer) monitor life count may be a variable representing the number of batches (or wafers) that may have gone through the manufacturing tool 110. The waiting batch (or wafer) monitor may be a variable representing the number of batches (or wafers) waiting to be processed by the manufacturing tool 110. The waiting to be processed batches (or wafers) may be a list of specified batches (or wafers). The new batch (or wafer) monitor life count may represent batches for which requests for processing have been received, but that have not yet been accepted for processing. The $TLLC_{sum}$ may be compared to the TLLC of the manufacturing tool 110. If the $TLLC_{sum}$ is greater than the TLLC specified for the manufacturing equipment 110, then the next batch or product wafer(s) may be rejected and the manufacturing equipment 110 put into a state of testing. A monitor wafer may be loaded into the manufacturing tool 110 for testing purposes.

In step 550, the manufacturing tool 110 is activated and the $MLLC_{sum}$ and $TLLC_{sum}$ are updated as the manufacturing process progresses. As described previously, the $MLLC_{sum}$ and $TLLC_{sum}$ may be updated based on product wafer or product batches that enter the manufacturing tool 110, or by other criteria.

In step 560, a determination may be made as to whether the $MLLC_{sum}$ is greater than the MLLC. If it is greater, then a monitor wafer (or batch) may be processed through the manufacturing tool 110 in step 570 to check for contamination or other problems that may affect the processing performed by the manufacturing tool 110. The method 500 may then continue to step 580, where the $MLLC_{sum}$ may be reset before returning to step 550. If the $MLLC_{sum}$ is not greater than the MLLC, then the method 500 may continue to step 590.

In step 590, a determination may be made as to whether the $TLLC_{sum}$ is greater than the TLLC. If it is greater, then maintenance may be performed in step 600. Such maintenance may include cleaning of the manufacturing tool 110, replacing a chemical bath, replacing parts and components of the manufacturing tool 110, or other types of maintenance. The method 500 may then continue to step 610, where the $TLLC_{sum}$ may be reset before returning to step 550. If the $TLLC_{sum}$ is not greater than the TLLC, then the method 500 may return to step 550.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method for scheduling a monitor job for a tool in a semiconductor manufacturing environment, the method comprising:
    receiving the monitor job;
    monitoring a status of the tool to determine when a predefined event occurs;
    identifying two events between which the monitor job should occur;
    identifying a position in a buffer in which to place the monitor job in response to the predefined event occurring, wherein placing the monitor job in the identified position will cause the monitor job to be executed at a correct time; and
    placing the monitor job in the identified position in the buffer.

2. The method of claim 1 wherein the buffer includes a plurality of production jobs, and wherein the method further comprises:
    determining whether at least some of the plurality of production jobs need to be rearranged in order to place the monitor job into the identified position; and
    rearranging at least some of the plurality of production jobs.

3. The method of claim 1 further comprising receiving a plurality of production jobs while monitoring the status of the tool.

4. The method of claim 1 wherein the position of the monitor job is based on a number of jobs that the tool can process prior to an occurrence of a maintenance event.

5. The method of claim 1 wherein the position of the monitor job is based on a number of jobs processed by the tool since an occurrence of a prior maintenance event.

6. The method of claim 1 wherein monitoring a status of the tool to determine when an event occurs comprises waiting for an event notification message.

7. A method for optimizing a number of jobs processed by a manufacturing tool having a plurality of processing portions, wherein each portion is associated with a threshold value, a new job count representing a request that has been received but not yet accepted to process a job using the portion, and a summation value that includes the new job count and a number of jobs designated for processing by that portion, the method comprising:
    identifying which of the portions are required for processing a job upon receiving a processing request for the job;
    updating the new job count for each portion that is required;
    comparing the threshold value for each portion with the summation value; and
    accepting the job for processing only if the summation value meets the threshold value.

8. The method of claim 7 further comprising scheduling the manufacturing tool for maintenance if the summation value for each portion fails to meet the threshold value for that portion.

9. The method of claim 7 further comprising scheduling a portion of the manufacturing tool for maintenance if the summation value for the portion fails to meet the threshold value for that portion.

10. The method of claim 7 wherein identifying which of the portions are required for processing a job is based on a recipe associated with the job.

11. The method of claim 7 further comprising calculating the number of jobs designated for processing by that portion, wherein the number of jobs is calculated using a processing batch life count representing a job currently being processed, and a waiting batch life count representing a job that is waiting for processing after being accepted for processing.

12. The method of claim 11 wherein calculating the number of jobs further uses a batch life level count representing a number of jobs that have passed through the portion and that have completed their processing through all portions.

13. The method of claim 12 further comprising calculating the batch life level count by subtracting a history life count representing a number of jobs that have been processed by the portion and are still undergoing processing by the manufacturing tool from a life count representing a number of jobs that have entered the portion.

14. A system for scheduling at least one job for a manufacturing tool in a semiconductor manufacturing environment, the system comprising:
    the manufacturing tool;
    a scheduler including a scheduling process, a job buffer, and one or more triggering events; and
    a plurality of instructions including:
        instructions for monitoring a status of the tool to determine when a triggering event occurs;
        instructions for identifying a position in the job buffer in which to place the job in response to the trigger event, wherein placing the job in the identified position will cause the job to be executed at a correct time; and instructions for placing the job in the identified position in the job buffer;

wherein the manufacturing tool comprises a plurality of processing portions, and wherein each portion is associated with a threshold value, a new job count representing a request that has been received but not yet accepted to process a job using the portion, and a summation value that includes the new job count and a number of jobs designated for processing by that portion.

15. The system of claim 14 wherein the job is a monitor job and wherein the job buffer includes a plurality of production jobs, wherein the system further comprises:

instructions for determining whether at least some of the plurality of production jobs need to be rearranged in order to place the monitor job into the identified position; and instructions for rearranging at least some of the plurality of production jobs.

16. The system of claim 14 further comprising a manufacturing execution system adapted for interacting with at least one of the manufacturing tool and the scheduler.

17. The system of claim 14 further comprising:

instructions for identifying which of the portions are required for processing a job upon receiving a processing request for the job;

instructions for updating the new job count for each portion that is required;

instructions for comparing the threshold value for each portion with the summation value; and instructions for accepting the job for processing only if the summation value meets the threshold value.

18. The system of claim 17 further comprising instructions for scheduling the manufacturing tool for maintenance if the summation value for each portion fails to meet the threshold value for that portion.

19. The system of claim 17 further comprising instructions for scheduling a portion of the manufacturing tool for maintenance if the summation value for the portion fails to meet the threshold value for that portion.

20. The system of claim 17 further comprising instructions for calculating the number of jobs designated for processing by that portion, wherein the number of jobs is calculated using a processing batch life count representing a job currently being processed, and a waiting batch life count representing a job that is waiting for processing after being accepted for processing.

21. The system of claim 20 wherein the instructions for calculating the number of jobs further include instructions for using a batch life level count representing a number of jobs that have passed through the portion and that have completed their processing through all portions.

22. The system of claim 21 further comprising instructions for calculating the batch life level count by subtracting a history life count representing a number of jobs that have been processed by the portion and are still undergoing processing by the manufacturing tool from a life count representing a number of jobs that have entered the portion.

* * * * *